Oct. 6, 1931.  L. C. STUKENBORG  1,826,101
COTTON BOLL GATHERER
Filed Aug. 29, 1929   2 Sheets-Sheet 1
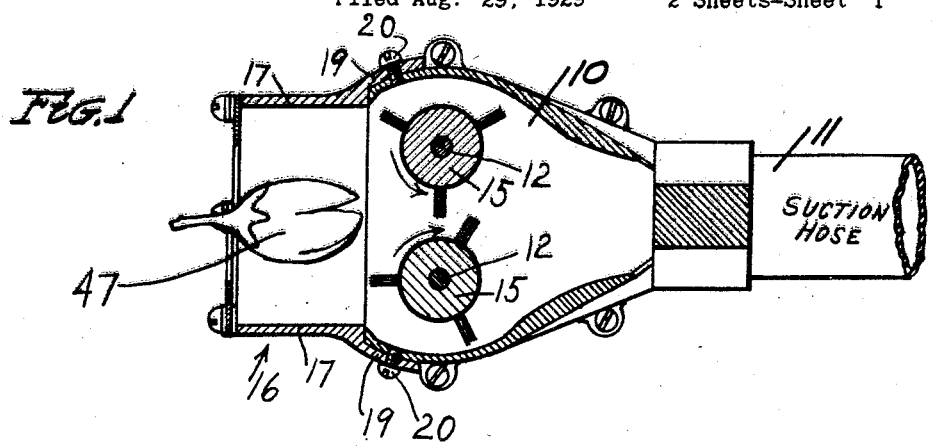
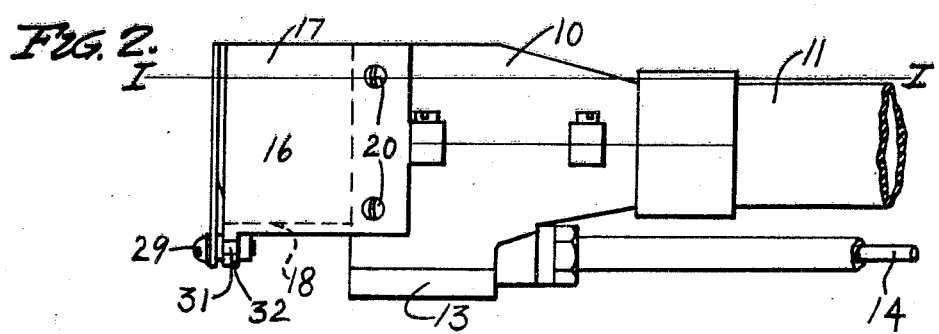
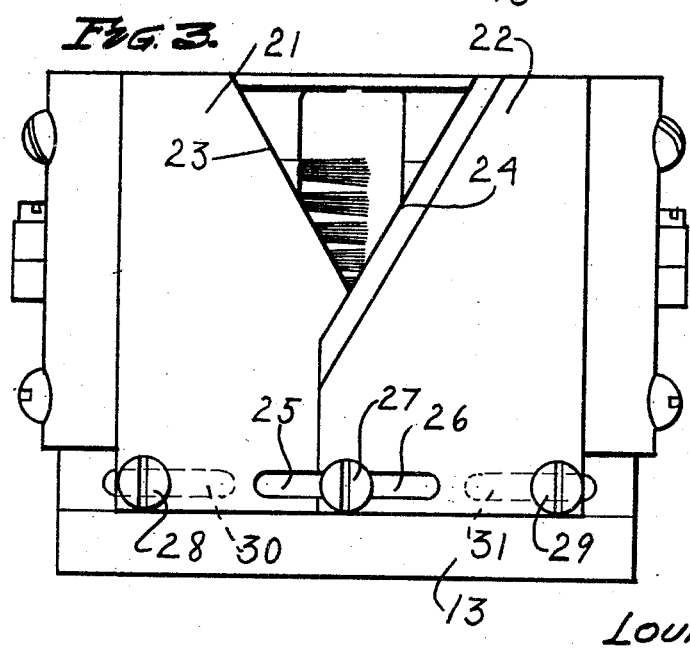
INVENTOR
LOUIS C. STUKENBORG
by J. H. Weatherford
ATTORNEY.

Oct. 6, 1931.    L. C. STUKENBORG    1,826,101
COTTON BOLL GATHERER
Filed Aug. 29, 1929    2 Sheets-Sheet 2
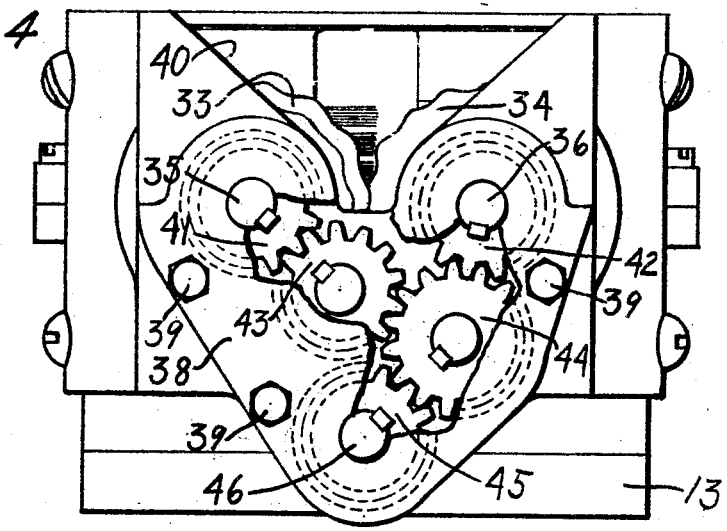
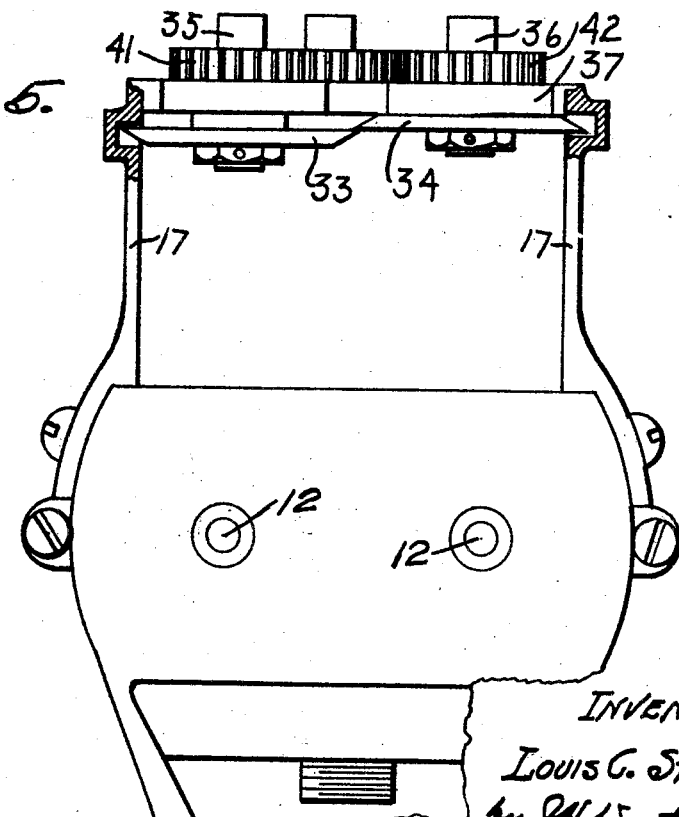
INVENTOR
Louis C. Stukenborg.
by J. H. Weatherford
ATTORNEY.

Patented Oct. 6, 1931

1,826,101

UNITED STATES PATENT OFFICE

LOUIS C. STUKENBORG, OF MEMPHIS, TENNESSEE

COTTON BOLL GATHERER

Application filed August 29, 1929. Serial No. 389,274.

This invention relates to improvements in devices for detaching unopened or partially opened cotton bolls from their stems, whereby such bolls may be harvested.

Where the cotton boll is fully matured it bursts open and exposes the cotton in position whereby it may be removed from the boll by a picking head such as is indicated in the drawings, but where weather conditions are unfavorable and cold frosty weather checks the growth of the plant before the bolls have opened, there are often large numbers of bolls in which the cotton is matured, yet which have not opened so that the cotton may be removed. In such cases it is often economically imperative that the bolls themselves be gathered, and crushed, and the cotton be removed therefrom.

The primary object of the present invention is to provide means whereby the boll may be cut or snapped from its stem and may thereafter be transferred from the gathering means in order that additional bolls may be similarly handled. A further object of the invention is to provide means whereby the severing knives may be shifted so as to present unused portions thereof for such severing purposes.

The means by which the foregoing and other objects are accomplished and the manner of their accomplishment will readily be understood from the following specification on reference to the accompanying drawings, in which:

Fig. 1 is a sectional plan of my device taken as on the line I—I of Fig. 2;

Fig. 2 is a side elevation of the device shown in Fig. 1;

Fig. 3 is an enlarged end elevation of the device;

Fig. 4 is a similarly enlarged end elevation of a modified form of the device showing a portion of the cover plate broken away to disclose the gearing therein; and Fig. 5 is a plan view of the same modification with the gear cover removed.

Referring now to the drawings in which the various parts are indicated by numerals, 10 is a hollow head, from which a flexible suction hose 11, extends rearwardly to such form of receptacle as may be desired. This head may be moved by hand in any desired direction within the reach of the suction hose and thereby be directed into engagement with the cotton boll which it is desired to remove. The forward end of this hollow head 10 is open and immediately rearward of such opening are vertical shafts 12 which are journalled in the top and bottom of the head. Secured to the bottom of the head is a removable cover 13 which encloses suitable driving mechanism by which these shafts may be operated from a flexible shaft 14. This driving mechanism not being a portion of the present invention need not be illustrated or described. Mounted on and secured to the shafts are brushes 15, which are driven in the direction shown by the arrows. The above mechanism is however an incidental part only of the present invention, and is shown and described merely as a means usuable for transferring a boll detached by the present mechanism and does not in its detail form part of the present device.

16 is a hollow member comprising substantially vertical sides 17 and a bottom 18, this member being open at the top and at both the front and back end. From the sides 17 lugs or extensions 19 extend rearwardly and are secured to the head 10 preferably by screws 20 which may be removed to permit the detachment of the hollow member. Mounted on the front or forward end of the hollow member 16 are co-operating knives 21, 22, which have inclined cutting edges 23, 24 respectively. These knives are disposed with their cutting edges facing each other and with one knife overlapping the other so that a V shaped knife edged slot is formed. The knives are oppositely beveled so that the cutting edges may come together when thus assembled. Preferably slots 25, 26 are formed near the lower portion of these knives, and through these slots a screw 27 is placed to secure them. Screws 28 and 29 are similarly placed through holes in the knives and these screws are extended through slots 30, 31 respectively, in a flange 32 which extends down from the bottom 18. These three screws serve to adjustably secure the knives to the forward end of the hollow member 16. By loosening the screws the knives may be shifted laterally inward making the V shaped slot shallower, or outward making it deeper and inasmuch as the cutting action of these knives is largely at the bottom of the V this adjustment makes it possible to dispose different portions of the knives in cutting position.

In Figs. 4 and 5, I show a modified form of the cutting knives. In this modification disk shaped knives 33, 34, preferably having corrugated or undulated cutting edges, are mounted on and secured to shafts 35, 36 respectively. These knives have oppositely beveled edges as before and preferably overlap as do the knives 23, 24. The shafts 35, 36 are journalled in a transverse head 37 which is preferably integral with the sides 17 of the hollow member and in a cover plate 38, disposed parallel with the head 37 but spaced therefrom to receive driving gears. 39 are screws which secure the cover plate to the head 37. A V shaped slot 40 is formed in the head 37 and the cover plate 39 to expose the working portion of the knives 33 and 34. Mounted on and secured to the shafts 35 and 36 are gears 41, 42 respectively. The gear 41 meshing with an idler gear 43 which in turn meshes with a second idler 44 with which the gear 42 also meshes. The gear 44 meshes with a driving gear 45 so that the knives 33 and 34 may be driven in opposite directions from such driving gear. The gear 45 is mounted on a shaft 46 which forms a direct extension of the shaft 14 which drives the brushes 15.

In using the device, in either form, the knives are brought upward beneath the stem of a cotton boll 47 and the stem end severed by the knife action or snapped by a light twisting motion of the head. The boll thus snapped off ordinarily is caught by the brushes 15 and crushed therebetween, such action ordinarily crushing the shell of the boll and assisting in its later treatment.

It will be understood that in using the head to detach the boll the forward end will from time to time be lifted so that even though a boll snapped off or cut off does not immediately reach the brushes, it will eventually so do and therefore be removed.

Having described my invention, what I claim is:

1. In a cotton boll gatherer, a head having an open mouth manually directable into engagement with the bolls, and having means therewithin for engaging and transferring a detached boll, and boll detaching means comprising a pair of rotatable knives mounted on the forward end of said head, said knives having facing and overlapping cutting edges, diverging upwardly apart to form a knife edged slot, and means for rotating said knives, whereby said knives may be moved against the stem of said boll to sever said stem.

2. In a cotton boll gatherer, a head having an open mouth manually directable into engagement with the bolls, and having means therewithin for engaging and transferring a detached boll, and boll detaching means comprising a pair of rotatable knives mounted on the forward end of said head, said knives having facing cutting edges, diverging upwardly apart to form a knife edged slot, and means for rotating said knives, whereby said knives may be moved against the stem of said boll to sever said stem.

3. In a cotton boll gatherer, a head having an open mouth, manually directable into engagement with the bolls, and having means therewithin for engaging and transferring a detached boll, and boll detaching means comprising a pair of rotatable knives mounted on the forward end of said head, said knives having undulated cutting edges facing and overlapping, and diverging upwardly apart to form a knife edged slot, and means for rotating said knives, whereby said knives may be moved against the stem of said boll to sever said stem.

4. In a cotton boll gatherer, a head having an open mouth manually directable into engagement with the bolls, and having means therewithin for engaging and transferring a detached boll, and boll detaching means comprising a pair of rotatable knives mounted on the forward end of said head, said knives having undulated cutting edges, facing, diverging upwardly apart to form a knife edged slot, and means for rotating said knives, whereby said knives may be moved against the stem of said boll to sever said stem.

In testimony whereof I hereunto affix my signature.

LOUIS C. STUKENBORG.